United States Patent
Paczkowski et al.

(10) Patent No.: US 11,308,185 B1
(45) Date of Patent: Apr. 19, 2022

(54) SYSTEM AND METHOD FOR DETERMINING MODIFICATIONS OF MEDIA FILES

(71) Applicant: T-MOBILE INNOVATIONS LLC, Overland Park, KS (US)

(72) Inventors: Lyle Walter Paczkowski, Mission Hills, KS (US); Galip Murat Karabulut, Vienna, VA (US); Marouane Balmakhtar, Fairfax, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 91 days.

(21) Appl. No.: 16/578,635

(22) Filed: Sep. 23, 2019

(51) Int. Cl.
 *G06F 21/12* (2013.01)
 *G06F 21/16* (2013.01)
 *G11B 20/00* (2006.01)

(52) U.S. Cl.
 CPC ............ *G06F 21/121* (2013.01); *G06F 21/16* (2013.01); *G11B 20/00898* (2013.01)

(58) Field of Classification Search
 CPC .. G06F 21/121; G06F 21/16; G11B 20/00898
 See application file for complete search history.

(56) References Cited

U.S. PATENT DOCUMENTS

| 2018/0254898 | A1* | 9/2018 | Sprague | H04L 9/3271 |
| 2020/0159891 | A1* | 5/2020 | Patel | G06F 16/9024 |
| 2020/0372184 | A1* | 11/2020 | Meirosu | H04L 9/006 |

* cited by examiner

*Primary Examiner* — Ashokkumar B Patel
*Assistant Examiner* — William B Jones

(57) ABSTRACT

System and methods are provided for determining whether a media file in a private network has been suspiciously modified. In embodiments, a server controlled by a service provider, for example, can generate a digital provenance for a media file from a trusted device and immutably store a hash value representing the digital provenance of the media file. Subsequent instances of the media file that are detected within the private network, in embodiments, are evaluated by the server using the digital provenance of the media file in order to identify changes to the content of the media file. In further embodiments, the server can modify the content of a suspiciously modified media file to include a marker that disclaims the content and/or otherwise indicates that the media file has been modified.

17 Claims, 5 Drawing Sheets

SYSTEM AND METHOD FOR DETERMINING MODIFICATIONS OF MEDIA FILES

SUMMARY

A high-level overview of various aspects of the invention are provided here for that reason, to introduce a selection of concepts that are further described in the following Detailed Description. This Summary is not intended to identify key features or essential features of the claimed subject matter, nor is it intended to be used as an aid in isolation to determine the scope of the claimed subject matter.

In brief and at a high level, this disclosure describes, among other things, a system and method for determining modifications made to media files. Embodiments herein provide that a user device can be configured with a trusted operating environment. When the user device uploads the media file to a service provider's telecommunication network of which the user device is subscribed, for example, a "chain of custody" can be generated by a server(s) and stored to an immutable ledger that is managed by the service provider's telecommunication network. Each subsequent instance of the media file that occurs within the telecommunication network can be evaluated by the server to determine whether the content of the media file has been edited, modified, or tampered with, for example.

BRIEF DESCRIPTION OF THE DRAWINGS

Illustrative embodiments of the present invention are described in detail below with reference to the attached drawing figures, and wherein.

DETAILED DESCRIPTION

Figure 1:
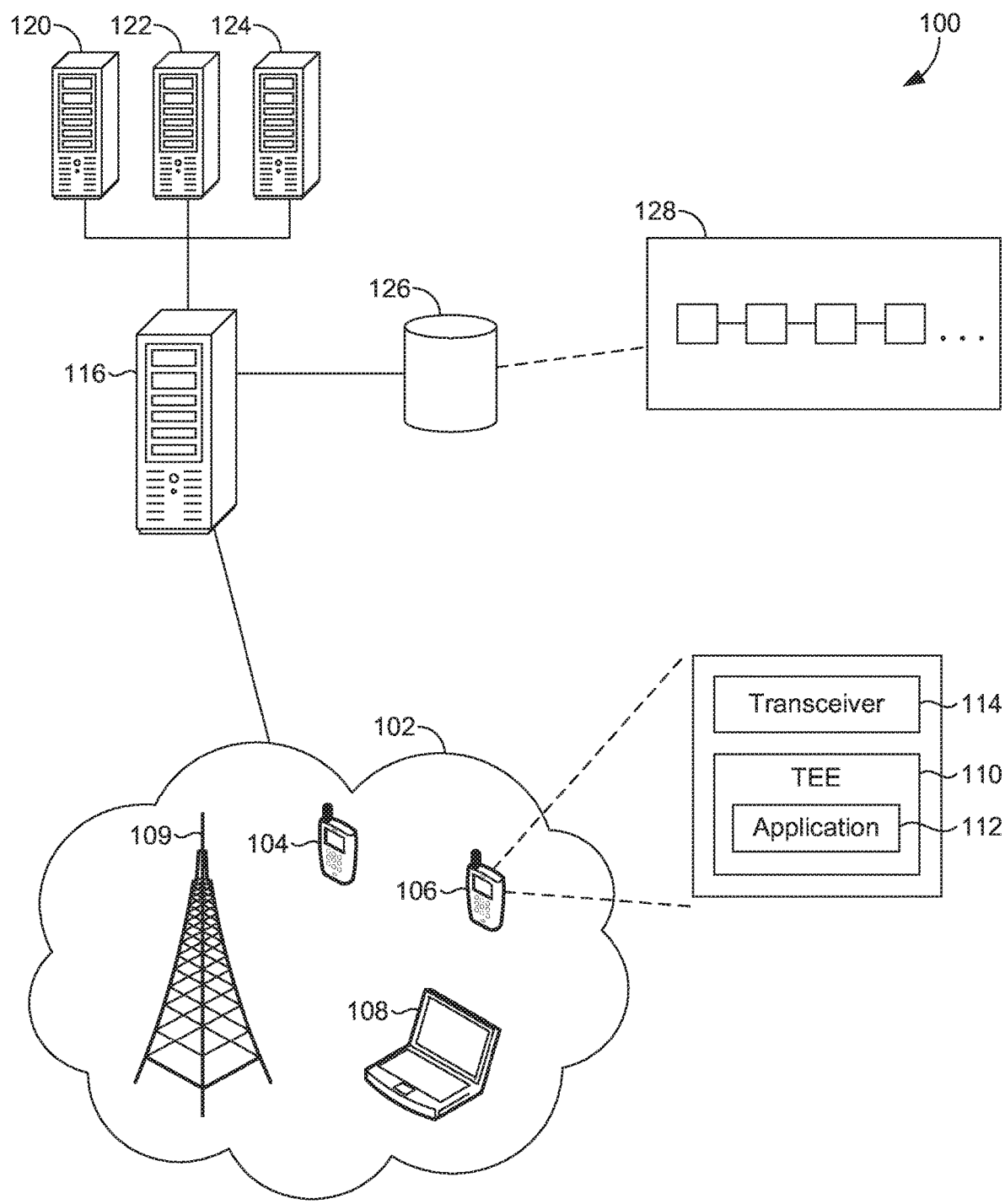
FIG. 1 depicts an example environment that is suitable for operation of an embodiment.

The subject matter of the present invention is being described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Terms should not be interpreted as implying any particular order among or between various steps herein disclosed unless and except when the order of individual steps is explicitly described. As such, although the terms "step" and/or "block" can be used herein to connote different elements of a system and/or method, the terms should not be interpreted as implying any particular order and/or dependencies among or between various components and/or steps herein disclosed unless and except when the order of individual steps is explicitly described. The present disclosure will now be described more fully herein with reference to the accompanying drawings, which are not be drawn to scale and which are not to be construed as limiting. Indeed, the present invention can be embodied in many different forms and should not be construed as limited to the embodiments set forth herein.

Throughout the description of the embodiments, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the embodiments. The following is a list of these acronyms:

3G Third Generation Wireless Technology
3GPP Third Generation Partnership Project
4G Fourth Generation Wireless Technology
5G Fifth Generation Wireless Technology
CDMA Code Division Multiple Access
CD-ROM Compact Disk Read Only Memory
DLT Distributed Ledger Technology
DVD Digital Versatile Discs
EEPROM Electrically Erasable Programmable Read Only Memory
E-UTRAN Evolved Universal Terrestrial Access Network
gNB Next Generation Node B
GPRS General Packet Radio Service
GSM Global System for Mobile Communications
iDEN Integrated Digital Enhanced Network
IMSI International Mobile Subscriber Identity
IMEI International Mobile Equipment Identity
LTE Long Term Evolution
MATEE Mobile Application Trusted Execution Environment
MDN Mobile Device Number
NAI Network Address Identifier
OFDMA Orthogonal Frequency Division Multiple Access
PBCH Physical Broadcast Channel
PC Personal Computer
PCS Personal Communications Service
PDA Personal Digital Assistant
PKI Public Key Infrastructure
PMP Portable Media Player
PSTN Public Switching Telephone Network
RAM Random Access Memory
ROM Read Only Memory
RoT Root of Trust
SMS Short Message Service
SPNCS Service Provider Network Capabilities Services
SRS Sounding Reference Signal
SS/PBCH Synchronization Signal/Physical Broadcast Channel
TDMA Time Division Multiple Access
TEE Trusted Execution Environment
UE User Equipment
UMTS Universal Mobile Telecommunications System
WCDMA Wideband Code Division Multiple Access
WiMAX Worldwide Interoperability for Microwave Access Further, various technical terms are used throughout this description. An illustrative resource that fleshes out various aspects of these terms can be found in Newton's Telecom Dictionary by H. Newton, 24th Edition (2008).

As used herein, "user device" can be used interchangeably with the terms "mobile device," "wireless communication device," "appliance," or "user equipment" (UE) for simplicity, and thus the terms should not be construed as limiting with regard to one another unless expressly designated as such in this Detailed Description. A user device can take on a variety of forms. Examples of a user device include a mobile phone, a "smart" phone, a smart watch, a wearable computing device, a handheld device, a companion device, a tablet device, a personal digital assistant, a personal computer, a "desktop" computer, a workstation, a laptop computer, a server, and/or a router. The user device can comprise one or more interfaces for user input, such as a keypad, a keyboard, a mouse, a touchscreen, a microphone, and/or speech recognition software. The user device can comprise one or more output components, such as an audio component (e.g., a speaker), a video player, a music player, a display, a liquid crystal display, and/or a projector. A user device can comprise a physical location component for determining a location by leveraging, for example, a Global Positioning System (GPS), Globalnaya Navigazionnaya Sputnikovaya Sistema (GLONASS), BeiDou Navigation Satellite System (BDS), Global Navigation Satellite System (GNSS or "Galileo"), an indoor position system (IPS), or other positioning systems that leverage non-GPS signals or networks (e.g., signals of opportunity (SOP)). The user device can comprise one or more of a gyroscope, an accelerometer, a temperature sensor, a humidity sensor, and/or any other sensor. A user device can comprise, for example, a power source, memory, a processor, a bus, a radio transmitter, a transceiver, and/or an antenna. Continuing, the term "user device" refers to a device with wireless communications capabilities. The user device can be capable of communicating using one or more different technologies, standards, and/or protocols for communications, whether wireless and/or hardwired. The user device can, for example, be capable of sending and/or receiving data using 3G, 4G, 5G, compatible next generation (e.g., 6G), LTE, CDMA, CDMA 1XA, GPRS, EvDO, TDMA, GSM, WiMax, Wi-Fi, WLAN, Bluetooth, NFC, LTE, and/or LTE Advanced networks, or any other type of network.

As used herein, "private network" refers to a communications network controlled by a particular entity or a group of related entities. In embodiments, user devices can be subscribers of an entity, such as a specific service provider, that controls and provides the private network. Examples of an entity include a telecommunications service provider, a business entity, or a non-business entity. The private network can operate on any geographic scale, e.g., global, nationwide, region, city, campus, building, or residential home. In embodiments, a private network can host and facilitate wireless communications, wired communications (e.g., fiber optic, Digital Subscriber Line (DSL), coaxial), or a combination of wireless and wired communications. The private network, in embodiments, is "private" in that a particular entity controls which users and devices are allowed to access the private network and further, controls how users and devices are allowed to operate in the private network. The entity can identify users and devices, and can authenticate users and devices in order to provide those parties with access to the private network.

As used herein, a "contemporaneous characteristic" refers to data that is measured or captured contemporaneously with one or more of the generation of the raw data of the media file, the generation of the initial hash value by the application, and/or the encryption of the initial hash value using a private key and/or using a public key, in embodiments.

The term "access point" refers to a device, whether local or remote to a physical location of a cell tower and/or antenna, having hardware and configured using complex software which enables the device to provide one or more user devices with a connection and/or access to a wireless private network. The device can comprise or can programmatically control one or more processors, an antenna, an antenna array, and/or one or more antenna elements, for example. Examples of an access point include a cell tower, a cell site, a base station, a NodeB, an eNodeB, a gNodeB, a macro cell, a micro cell, a femtocell, a picocell, and/or a computing device capable of acting as a wireless "hotspot." The terms "access point," "cell site," "base station," and "cell tower" are used interchangeably herein for simplicity and thus the terms should not be construed as limiting with regard to one another unless expressly designated as such in this Detailed Description. Examples of a cell site include macro cells such as a cell tower controlled by a gNodeB, as well as small cells, such as a femtocell or picocell. Accordingly, the scale and coverage area of an access point is not limited to the examples discussed, and any size and shape of coverage area are contemplated to be within the scope of the invention. Because a cell tower and a base station controlling the cell tower can be remote from one another, or alternatively can be localized to each other, the term "access point" is not intended to be so limited as to require a cell tower and/or antenna.

As used herein, "suspicious modification" refers to a modification to the content of a media file that cannot be attested to, using the systems and methods discussed herein for determining hash value changes. Additionally or alternatively, a modification to a media file can be a suspicious modification when the identity of the device that is responsible for performing the modification or that is associated with the modification to the media file cannot be identified, is not known, could not be verified, and/or could not be authenticated, in various embodiments.

As used herein, "digital provenance" refers to data stored sequentially in an electronic ledger, wherein the data documents one or more of the generation, encryption, decryption, transfer, communication, social media post, internet-based upload, and/or modification of a specified file, such as a media file. Examples of a media file include an image file, a video file, an audio file, an augmented reality file, and a virtual reality file. The data stored in the electronic ledger can include one or more hash values for the specified file, and further, can store one or more contemporaneous instances of the specified file.

Embodiments can include, among other things: a method, system, or set of instructions embodied on one or more computer-readable media. Computer-readable media include one or more of volatile or nonvolatile media, removable or non-removable media, and computer-readable media contemplates media readable by a database, a switch, and various other network devices. In embodiments, computer-readable media comprises media implemented in any method or technology for storing information. Examples of stored information include computer-useable instructions, data structures, program modules, cloud-based storage, network-based storage, and other data representations. Media examples include information-delivery media, primary storage media such as RAM, and secondary storage media such as a hard drive. Media examples can include ROM, EEPROM, flash memory, or other memory technology, CD-ROM, digital versatile discs (DVD), Blue-ray discs, holographic media, optical disc storage, magnetic cassettes, magnetic tape, magnetic disk storage, and other magnetic storage devices. These technologies can store data momentarily, temporarily, or permanently. As used herein, computer-readable storage media does not comprise a signal per se.

At a high level, embodiments herein discuss a system and a method for determining whether modifications have been made to media files. The system and method can determine when media files in a private network have been edited, and thus, may contain false information or content. As such, the system and method can automatically recognize "deep fakes" of images, video, audio, and/or other digital media, for example, without relying on complex image, video, and/or audio analyses. With the ubiquitous rise of internet-capable machines (e.g., smart phones, smart watches), users now consume fact and fiction multiple times a day through the internet, such that there is an ever-growing need for detecting misinformation that is spreading or circulating on the internet. Despite the level of sophistication of photo-editing, video-editing, and virtual reality software, the internet is treated as a trusted source of fact by users, even though the internet is often stranger than fiction: rife with false news, faked images, questionable video, bogus websites, and doctored content of every kind, all of which can easily fool the human eye.

For example, the average consumer of internet content is unable to discern whether a social media influencer is truly traipsing through Paris in a utopia full of designer clothing, or has merely used easily available photo-editing software to adopt a realistic Parisian background that fools the average consumer into believing a glamorous (un)reality. In another example, the average consumer of internet content is unable to discern that an exceptionally realistic video showing a politician behaving badly has been cunningly created using sophisticated virtual reality software to artfully mimic the appearance, voice tone and speed, speech inflection and accent, and bodily mannerisms of the politician in an effort to maliciously spread misinformation and influence public perception. With the advancement in photo, video, and virtual reality applications, it is imperative that fraudulent content circulating on the internet be detected, independent of the application or social media platform on which the content exists, for example. Embodiments herein are able to identity modified media files, even when those modified media files would otherwise fool the human eye. Embodiments herein are capable of tagging or changing the modified media files in order to inform a consumer of the content that the media file has been suspiciously modified and the content is not trusted. In this way, the embodiments are able to identity deep fakes, for example, which users are not able to recognize.

In order to determine when media files have been edited, and thus, may contain false information or content, embodiments herein include a system and method that generate a unique digital provenance for an individual media file within a private network. The system and method use a unique hash of the media file to document the creation of the media file at a particular user device, to document the entry of the media file (e.g., upload) into a private network, and to record the digital provenance of the media file in a distributed ledger for subsequent reference of the state(s) of the media file. In embodiments, the digital provenance of a media file is "trusted" or attested to by the private network based on a Trusted Execution Environment (TEE) of a user device. Generally, the digital provenance of a media file is established through a TEE of a user device when the media file initially enters the private network, and the digital provenance is immutable and permanent once recorded in the distributed ledger. Using the distributed ledger to monitor and record each transaction, communication, transfer, or other "movement" of a media file through the private network (e.g., shared between user devices, shared through social media), the system and method determine whether a modification of the media file has occurred by referencing the digital provenance. For example, the system and methods can determine whether a modification to a media file is suspicious based on a hash value of the present instance of a media file relative to the digital provenance of the media file that was immutably recorded at the entry of the media file into the private network using the distributed ledger, in some embodiments. As such, one or more server(s) operating on the private network can predict the veracity or lack of veracity of the media file that has been modified based on the hash value of the present instance of the media file and the provenance of the media file recorded in the distributed ledger, in embodiments.

When suspicious modifications are detected or determined, the system and method further modify the media file by adding data to the media file that marks, labels, or tags the media file as having experienced suspicious modifications post-creation (e.g., a low confidence level in veracity or authenticity), in some embodiments. The additional data can be used to designate that the content of the media file is not factually trustworthy to any persons who can view, listen, share, or otherwise consume the content of the media file, in some embodiments. For example, the additional data can be added to the content of a digital image file, wherein the additional data adds a watermark presenting text (e.g., "Warning" or "Unverified" or "Fake News" or "???" or "!") in any language or script, or a graphic (e.g., an icon or emoji) that indicates to a party that the digital image file has been determined to have been suspiciously modified. As further discussed, the system and methods herein can automatically recognize media files in the private network that contain false information or content, and further, can automatically recognize "deep fakes" of images, video, audio, and/or other digital media, for example, without relying on complex image, video, and/or audio analyses.

Turning to FIG. 1, an environment 100 is depicted for implementation of embodiments discussed herein. In various embodiments, the environment 100 includes a private network 102. The private network 102 can be a telecommunications network, in some embodiments. For example, the private network 102 can belong to a particular service provider, in some embodiments. In various embodiments, the private network 102 can support 3G, 4G, 5G, 5G New Radio (NR), and/or 6G technologies. In one embodiment, the private network 102 is a 5G NR telecommunications network.

In FIG. 1, one or more user devices 104, 106, and 108 are shown. The one or more user devices 104, 106, and 108 can be subscribers to a service provider that is associated with the private network 102, in some embodiments. In an embodiment, at least one of the one or more user devices 104, 106, and 108 are specially configured with a Trusted Execution Environment (TEE) 110, based on a certificate authority provided over the private network 102. In embodiments, the term "TEE" refers to a secure, isolated operating area inside a main processor of a user device. In embodiments herein, code for applications can be loaded into and executed within the TEE at the user device. In further embodiments, the TEE 110 can be a Mobile Application Trusted Execution Environment (MATEE). The one or more user devices 104, 106, and 108 can further comprise an application 112 that is configured to operate within the TEE 110, in an embodiment. Each of the one or more user devices 104, 106, and 108 can include a transceiver, such as transceiver 114 that enables the one or more user devices 104, 106, and 108 to communicate wirelessly over the private network 102. The private network 102 can be accessible to the one or more user devices 104, 106, and 108 through an access point 109.

The environment 100 further comprises a server 116. Although shown in the singular, it will understood that the server 116 can represent any number of servers. In embodiments, the server 116 is a back-end or centralized server that supports the private network 102 and that is associated with a service provider. The server 116 can be a secure server that corresponds to a particular service provider, in embodiments. The server 116 can further comprise a Service Provider Network Capabilities Service (SPNCS) 118, in some embodiments. In an embodiment, the SPNCS can record or document network parameters, service provider parameters, and/or subscriber parameters. The network parameters, service provider parameters, and/or subscriber parameters can be used by the server 116 to attest to media files uploaded from user devices, as discussed hereinafter.

In embodiments, the server 116 can communicate with one or more nodes 120, 122, and 124 forming an Immutable Network Service (INS). The one or more nodes 120, 122, and 124 can be any type of computing device. The INS is secure and corresponds to a particular service provider, in embodiments. The INS formed by the one or more nodes 120, 122, and 124 can use Distributed Ledger Technology (DLT) to store hash values and other information to a distributed electronic ledger, as discussed hereinafter. In embodiments, the DLT is secure and private, as operating in the private network. Accordingly, a service provider, for example, can control which users and devices are allowed to access the DLT, can control how users and devices are allowed to operate with regard to the DLT, and can control the visibility of communications between users, devices, and the DLT in the private network. For example, the DLT operating in the private network 102 enables confidential transactions, meaning that two users can create a private channel, conduct a transaction between the two users using the private channel, and the channel and transaction are not visible to other users, in some embodiment. In some embodiment, the DLT lacks a cryptocurrency.

In embodiments, the environment 100 comprises a data store 126. In some embodiments, the data store 126 can be a Network Provider Data Center (NPDC). The data store 126 can store one or more records and can maintain a blockchain 128 of records, in embodiments. For example, hash values and other information that corresponds to an instance of a particular media file, as discussed hereinafter, can be stored as discrete records in a blockchain for that particular media file. As the data store 126 is connected to the server 116, the server 116 communicates hash values to the data store 126 by monitoring the private network 102 for any and/or all instances of media files that are being shared over the private network 102.

Establishing Digital Provenance of a Media File

When a user device connects to the private network, the private network can determine whether the user device is registered with a network (i.e., a known user device) and can determine whether the user device is equipped with a TEE. A user device determined to be equipped with a TEE can be considered a known and trusted device by the private network and servers in the private network. The user device can be known and trusted by the private network, for example, based on a certificate of authority that underlies the TEE, as further discussed. For example, the user device can be provisioned with a certificate of authority that is issued, controlled, and provided by the private network. In embodiments, a server associated with the private network can generate a certificate of authority, and can communicate the certificate of authority to the user device over the private network. The certificate of authority can be used to access and open a security monitor in a silicon chip of the user device, for example, so that credentials of trust are deposited in the security monitor of the user device. The credentials of trust can be issued, controlled, and provided by the private network, in embodiments. Accordingly, the certificate of authority and the credentials of trust can be retracted or inactivated by the private network. This network-based control of the certificates of authority of the TEE serve as the basis for the private network recognizing the user device as a trusted user device.

Continuing, in order to generate a TEE on a user device having a network-controlled certificate of authority used to access and open the security monitor, a space can be opened in the silicon chip of the user device, where that space acts as the TEE, in embodiments. The TEE can act as an operating system (OS) and/or a cache, for example, where mobile applications on the user device can be stored and/or executed within the TEE, for example. The mobile applications are, generally, specially configured to operate within the TEE, in some embodiments. For example, the security monitor and boot sequence of a mobile application can be modified to condition the mobile application to execute within the TEE. Once conditioned, the mobile application is recognized by the controlled application as being a trusted mobile application that is configured to execute within the TEE, in an embodiment. Because the TEE relies on the private network-controlled certificate of authority, the private network recognizes and trusts the TEE of the user device, recognizes the user device as a trusted device, and recognizes mobile applications that are conditioned to execute in the TEE as trusted mobile applications, in some embodiments.

Accordingly, when a server of the private network recognizes the user device is equipped with a TEE that is based on a certificate of authority issued, provided, and controlled by the private network, the server of the private network is able to attest to the identity of the user device based on the TEE, where the TEE acts as an operating system with Root of Trust ("RoT") functions. Once established as the RoT, the server of the private network recognizes the provenance of a media file that is generated by an application executing within the TEE of the user device and is uploaded to the private network.

In contrast, when the server of the private network determines that the user device does not include a TEE, the server of the private network does not treat the user device as an RoT. Further, in some embodiments, the server of the private network does not recognize the provenance of a media file that is generated by an application of an unknown user device. In one such embodiment, the server generates a pseudo-provenance for the media file because the private network is unable to verify the user device due to the absence of a TEE at the user device. For example, the server can generate a pseudo-provenance for the media file by recording unique characteristics of the private network itself and associating the unique network characteristics with the media file. In this way, though the origin of a media file is not verifiable by the private network due to the user device lacking a TEE, in some embodiments, the server can identify and verify the access point from which the media file originated or entered into the private network, and the access point can serve as a pseudo-provenance. The term "pseudo" is used herein to indicate that a digital provenance established for a media file based on the access point is less robust relative to a digital provenance based on a known user device having a TEE, as understood by the private network.

Accordingly, in some embodiments, when the server determines that the user device is trusted based on the TEE, the server can generate a provenance for a media file that was generated by an application executing within the TEE of the user device and that is uploaded to the private network. Additionally or alternatively, when the server determines that the user device is not trusted based on the lack of a TEE, the server can build a pseudo-provenance for a media file that was generated by an application executing outside a TEE and that is uploaded to the private network, in some embodiments.

It will be understood that references to a user device lacking a TEE encompass a user device having a TEE but which is executing an application outside of a TEE. As such, the phrase "user device lacking a TEE" is used for simplicity of the discussion and is not intended to be limiting in scope. For example, the server can generate a pseudo-provenance for a media file that is generated by an application simply operating outside of a TEE of a user device. In embodiments, the provenance or pseudo-provenance of a media file can be recorded to a distributed ledger.

Figure 2:
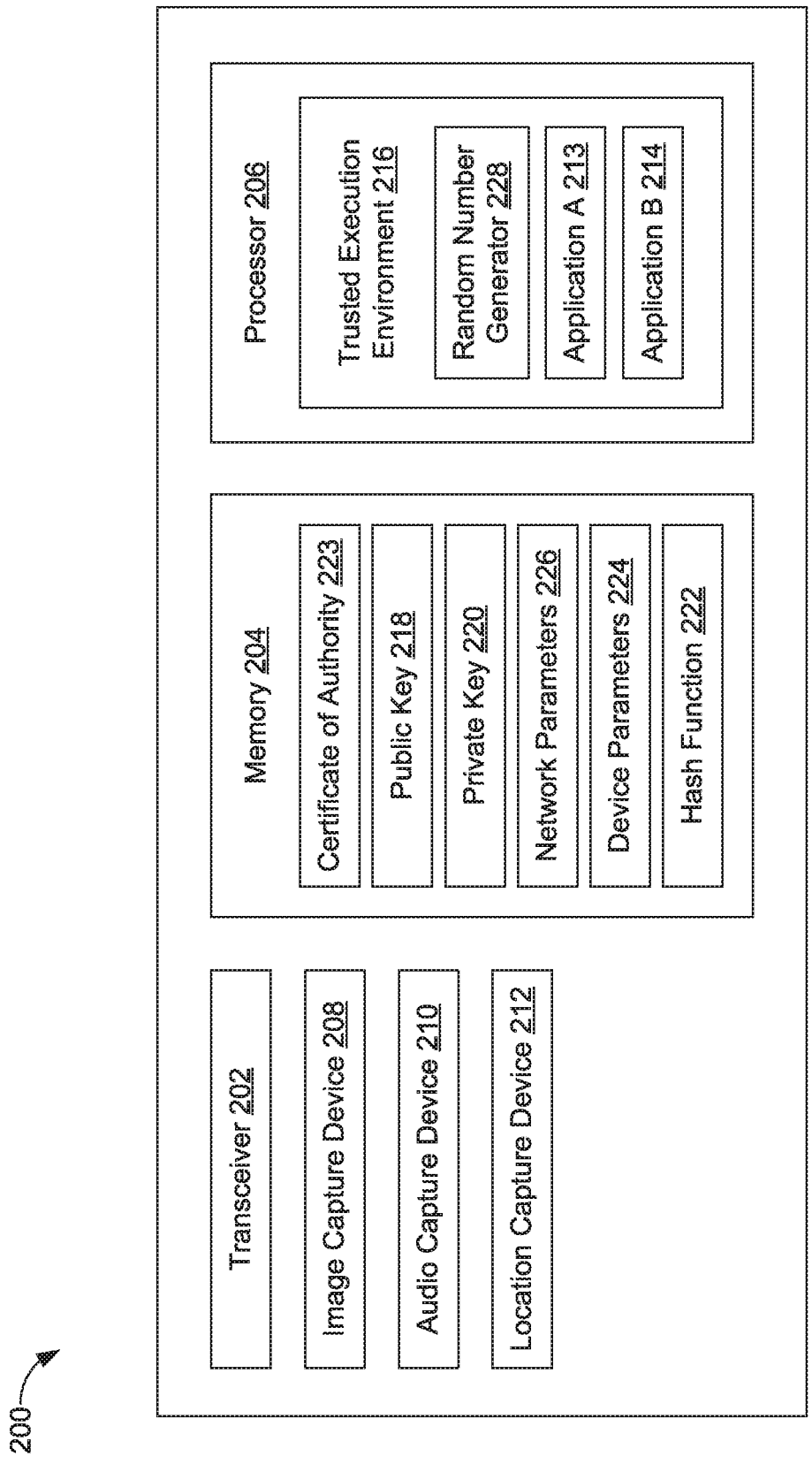
FIG. 2 depicts an example of user equipment that is suitable for operation of an embodiment.

Looking to FIG. 2, an example of user equipment that is suitable for operation of an embodiment is shown. In an embodiment, the user equipment 200 comprises a transceiver 202, memory 204, and a processor 206. The memory 204 can store a certificate of authority 223, such that the user equipment 200 can be a trusted device operating in a private network, in embodiments, as discussed hereinafter. The user equipment 200 can further comprises at least one of an image capture device 208, an audio capture device 210, or a location capture device 212. The image capture device 208 and/or the audio capture device 210 can be used capture raw data of the environment and/or surrounding of the user equipment 200, wherein the raw data can be used to generate a media file. The media file can be stored, for example, in the memory 204 of the device, either temporarily or permanently. The media file can be encrypted and/or hashed using application A 213 and/or application B 214, as operating in a trusted execution environment (TEE) 216 in the processor 206, in some embodiments, as discussed in detail with regard to methods hereinafter. Although an application is not shown as operating outside of the TEE 216, it will be understood from this description that the user equipment 200 can include any number of applications, for example, some of which can operate as trusted applications within the TEE 216 and some of which that are not trusted applications and which operate outside of the TEE 216.

In some embodiments, the encryption and/or hashing of a media file can leverage one or more of a public key 218 corresponding to and provided by a private network, a private key 220 corresponding to the one particular user equipment 200 and provided by the private network, a hash function 222 into which the raw data of the media file can be input, and further, one or more contemporaneous characteristics stored as device parameters 224 in the memory 204, and which can be captured in real-time or near real-time with, for example, the creation, encryption, or hashing of the media file at the user equipment 200. Additionally or alternatively, the encryption and/or hashing of a media file can leverage one or more of the public key 218, the private key 220, the hash function 222, and further, one or more contemporaneous characteristics, stored as network parameters 226 in the memory 204, in various embodiments. The application A 212, application B 214, and TEE 216 can leverage a random number generator 228, for example, when hashing a media file, whether alone or in combination with one or more contemporaneous characteristics such as the device parameters 224 and/or network parameters 226. It will be understood that, in some embodiments, the user equipment can 200 lack a random number generator 228, such that the user equipment 200 can instead access a remote random number generator of a different device on the private network when preforming encryption and/or hashing of a media file. Detailed aspects of the interactions of the user equipment 200 in the environment 100 will now be discussed in detail with regard the following methods.

Figure 3:
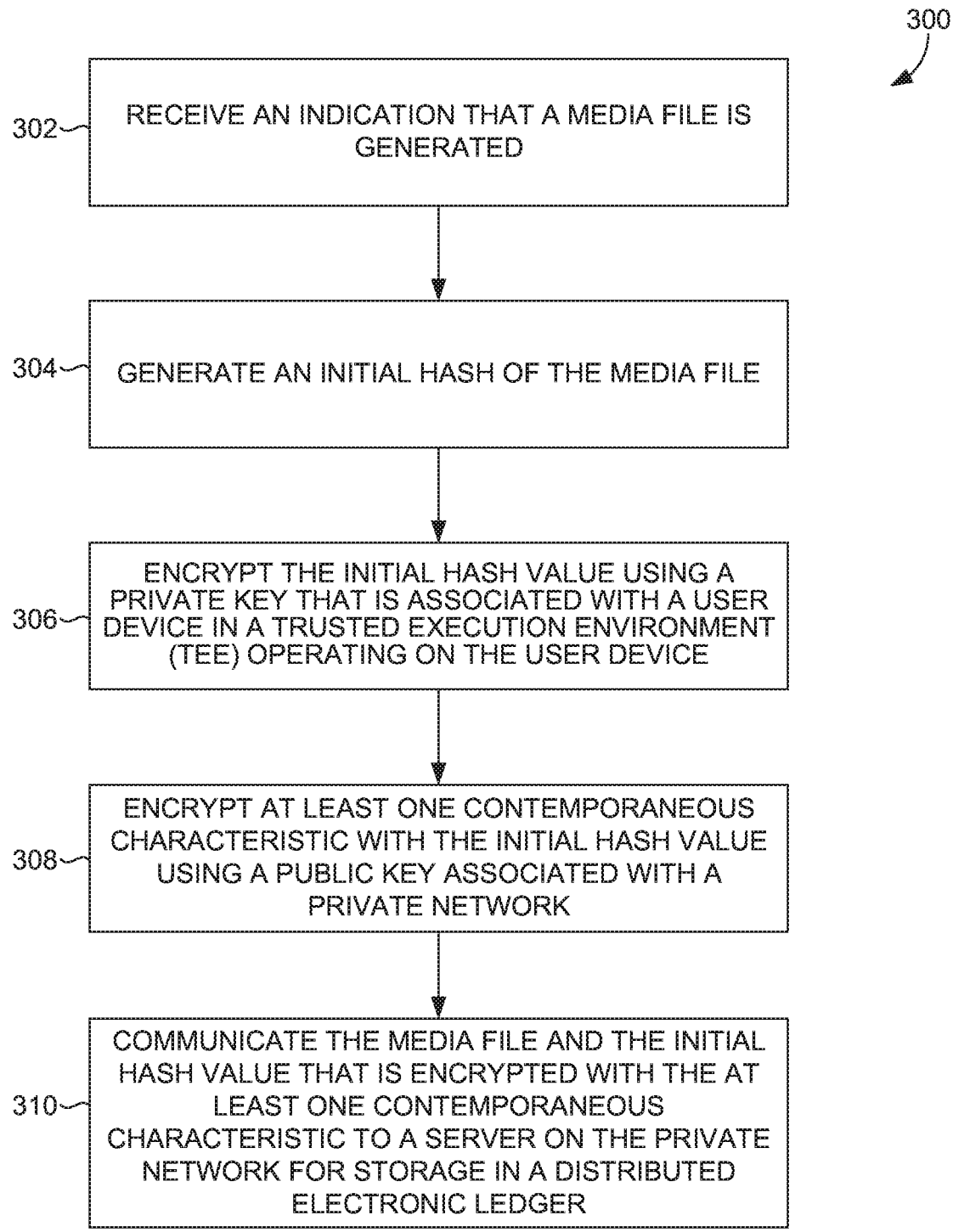
FIG. 3 illustrates an example method in accordance with an embodiment.

Continuing to FIG. 3, a method 300 is provided for establishing a provenance of a media file. In some embodiments, the method 300 can be a computer-implemented method. In one embodiment, one or more non-transitory computer-readable storage media having computer-readable instructions or computer-readable program code portions embodied thereon, for execution via one or more processors, can be used to implement and/or perform the method 300. For example, computer-readable instructions or computer-readable program code portions can specify the performance of the method 300, can specify a sequence of steps of the method 300, and/or can identify particular component(s) of a software and/or hardware for performing one or more of the steps of the method 300, in embodiments. The computer-readable instructions or computer-readable program code portions can correspond to an application and/or an application programming interface (API), in some embodiments. In one embodiment, the application or API can implement and/or perform the method 300. As discussed below, the method 300 can be performed using software, hardware, component(s), and/or device(s) depicted in the example of FIGS. 1 and/or 2. For example, one or more steps of the method 300 can be performed at a user device, using one or more processors of the user device, to support an application for generating a media file and to support a TEE at the user device.

At block 302, an indication is received that a media file is generated at a user device. For example, an application operating on a user device can generate a media file by using a camera, microphone, or other equipment of the user device to capture content comprising one or more of audio, image (s), video, or the like. The media file can include an image of surroundings captured using a camera at the user device, for example. The media file can be stored locally in permanent or transient memory of the user device, in embodiments. The media file can reside within the application at the user device.

At block 304, an initial hash value of the media file is generated. In embodiments, the initial hash value is generated by an application. For example, the application can use the raw data of the media file as the input to a cryptographic hash function that returns a fixed-size string of bytes representing the media file, i.e., the hash value. Examples of cryptographic hash functions include MD5, SHA-1, SHA-2, SHA-3, RIPEMD-160, b-crypt, Whirlpool, and BLAKE2. In an embodiment, the application can leverage a random number generator (RNG) at the user device or accessible over a wireless network (e.g., server-side) in order to generate the initial hash value from the raw data of the media file. Additionally or alternatively, the application can utilize environmental data (e.g., a noise signal, ambient noise) captured at the user device or an access point associated with the user device for the random number generator aspect, which is non-replicable. The application can pass or send the initial hash value to a TEE for encryption, in some embodiments.

At block 306, the initial hash value is encrypted using a private key that is associated with the user device. The private key can be uniquely assigned to the user device by a service provider of the private network, in embodiments. For example, the private key can be a unique key that is generated using the PKI infrastructure and that is assigned to the user device when the user device is registered with a private network of a service provider. As such, the service provider in the private network controls, has access to, and provides a different and separate private key to each user device in the private network, for example. In this way, only the service provider and the user device associated with a particular private key has knowledge of that private key. In embodiments, the encryption of the initial hash value using the unique private key associated with the one particular user device is performed within a TEE operating on the user device. Once encrypted using the private key that is unique to the one particular user device, the TEE can pass or send the encrypted initial hash value back to the application that generated the initial hash value.

At block 308, at least one contemporaneous characteristic is encrypted with the initial hash value, using a public key that is associated with a private network. For example, the at least one contemporaneous characteristic can be added to the initial hash value and the combination of the at least one contemporaneous characteristic and the initial hash value are encrypted using the public key that is associated with the private network. The at least one contemporaneous characteristic can be appended to the initial hash value, or can be pre-pended to the initial hash value, and then the encryption can be performed, in some embodiments. In embodiments, the at least one contemporaneous characteristic includes a network specific parameter and/or a subscriber specific parameter. Examples of a contemporaneous characteristic include one or more of: an International Mobile Equipment Identity (IMNI), an International Mobile Subscriber Identity (IMSI), EC, a Global Positioning System (GPS) location, an Internet Protocol (IP) address, an S1 interface protocol, or Inter-member Network data. Additional examples of a contemporaneous characteristic include base station specific parameters, such as a unique identifier of a base station to which the user device is connected, a GPS location of the base station to which the user device is connected, environmental data associated with the base station (e.g., ambient noise, a noise signal, signal speed), and the like. Accordingly, in embodiments, the application combines the at least one contemporaneous characteristic with the private-key encrypted initial hash value and encrypts the combination thereof using the public key. Generally, the public key is shared between a service provider of a private network and a plurality of devices that are registered with the service provider, in embodiments. As such, the public key is associated with the service provider, in contrast to the private keys of user devices discussed earlier. However, like the private key, the public key is also controlled and managed by the service provider of the private network.

Continuing, at block 310, the initial hash value that is encrypted with the at least one contemporaneous characteristic is communicated to a server on the private network. The media file and initial hash value can be wirelessly communicated, for example, from the user device and over the private network, for upload to an internet-based website, application, email account, SMS text message, social media platform, or direct messaging application, for example. Generally, the media file enters the private network in this manner, for example, for social media sharing, internet publication, or the like, in embodiments. While the media file is communicated for sharing with other users in the private network, for example, the initial hash value that is encrypted with the at least one contemporaneous characteristic is communicated to the server for storage in a distributed electronic ledger. The server, in embodiments, is controlled by or associated with a service provider. In some embodiments, when the initial instance of the media file and the initial hash value are received from the user device, the server can reference the certificate of authority of the user device, and when referenced and identified, the server can attest that the user device includes a trusted execution environment operating as the root of trust based on the certificate of authority.

Prior to storing the initial hash value to a distributed electronic ledger, the server associated with the service provider determines whether the content of the media file has or has not been modified since the media filed was initially generated at the user device, in embodiments. For example, the server on the private network is configured to receive the instance of the media file (e.g., as uploaded from the user device) and the initial hash value that is encrypted with the at least one contemporaneous characteristic. The server can determine whether there are any other instances of the particular media file in the private network, in further embodiments. However, on the initial entry of the media file into the private network, the server can recognize that the particular instance of the media file is the initial instance of the media file in the private network, in one embodiment. Additionally, the server can determine that the initial instance of the media file was received from a user device that is registered with the private network, in an embodiment. For example, the server can utilize information or data communicated from the user device to recognize the particular identity of the user device. Further, in embodiments, when the server identifies the particular identity of the user device, the server can also recognize that the user device includes a TEE with RoT functions, as discussed above.

Based on the recognition of the user device as being registered with the service provider and based on recognition of the identity of the user device, in some embodiments, the server can decrypt the initial hash value using the public key associated with the service provider and/or using the private key associated with the user device. The server can, in embodiments, determine whether the at least one contemporaneous characteristic in the initial hash value corresponds to private network data. For example, the Service Provider Network Capabilities Service on the server can be used to reference a server-side record network, service provider, and/or subscriber parameters that correspond to particular dates, times, physical locations, access points, and/or user devices. As the contemporaneous characteristic that was encrypted with the initial hash value includes a network specific parameter and/or a subscriber specific parameter, the server associated with the service provider has prior knowledge of the same network specific parameter and/or a subscriber specific parameter from the server/network side, in embodiments. In this manner, the server can determine whether the network specific parameter and/or a subscriber specific parameter of the at least one contemporaneous characteristic, which is obtained from the user device having a TEE, corresponds to and/or matches the network specific parameters and/or a subscriber specific parameter that were recorded on the server-side of the private network for the known user device. Accordingly, the at least one contemporaneous characteristic recorded using the TEE/user device side can be compared to at least one characteristic on the server/network side. For example, the server can determine when the International Mobile Equipment Identity (IMNI) of the user device matches the server-side knowledge of the IMNI, can determine when a Global Positioning System (GPS) location of the user devices matches the server-side knowledge of the GPS location of that user device, and the like.

When the contemporaneous characteristic provided from the user device matches the server-side recorded characteristic(s), the server associated with the service provider determines that the media file was not modified subsequent to generation at the identified and trusted user device. Based on the determination that the file was not modified subsequent to generation at the identified and trusted user device, the server further determines that the content of the media file has not been suspiciously modified (e.g., image has not been tampered with by a user through photo editing). The server can, therefore, infer that the veracity of the content of the media file is intact, in some embodiments. Accordingly, the server can attest to the initial instance of the media file based on the contemporaneous characteristic determination, in embodiments.

In further embodiments, based on the server having determined that the content of the media file has not been suspiciously modified, the server can determine to store a hash value of the initial instance of the media file to a distributed electronic ledger. For example, the server can generate a second hash value of the initial instance of the media file. Then, the server can encrypt the second hash value of the initial instance of the media file using the public key that is associated with the private network. In embodiments, the server communicates the encrypted second hash value of the initial instance of the media file to one or more nodes, which facilitate storage of the encrypted second hash value in a distributed electronic ledger. Accordingly, based on determining that the at least one contemporaneous characteristic in the initial hash value corresponds to private network data, and thus determining that the content of the media file has not been suspiciously modified, the server can communicate the public-key encrypted second hash value of the initial instance of the media file for storage on a distributed electronic ledger. In further embodiments, the server can also store an attestation of the initial hash value of the initial instance of the media file and/or a representation of the state of the media file to the distributed electronic ledger.

In some embodiments, the server can determine that the media file has been modified and can further determine that the modification is not suspicious. For example, prior to storing the initial hash value to a distributed electronic ledger, the server associated with the service provider can determine that the content of the media file has been modified since the media file was initially generated at the user device, in embodiments.

For example, the media file can be modified at the user device to include virtual content at the user device. In one example, the media file can comprises audio, image(s), and/or video of the surroundings at the user device along with virtual content that was manually and/or automatically added by the application (e.g., image filters, augmented reality, avatars). In such an example, after the media is initially generated, the user device can receive an indication that content of the media file is modified at the user device subsequent to generating the initial hash. In response, the user device can generate a new hash value of the modified media file, in embodiments. In further embodiments, the user repeats the previously described aspects with regard to the modified media file, for example, by encrypting the new hash value using the private key that is associated with the user device in the trusted execution environment (TEE) operating on the user device, and by encrypting a new contemporaneous characteristic with the new hash value using the public key associated with the private network. In an embodiment, the user device communicates, in addition to the initial hash value, the modified media file and the new hash value that is encrypted with the new contemporaneous characteristic to the server on the private network for storage in the distributed electronic ledger.

In such an embodiment, the server can determine that the initial hash value is different from the new hash value. For example, the server on the private network can determine that the media file has been modified at the user device based on the differences between the initial hash value and the new, subsequent hash value. In the example, the server can determine that the modification to the media file is not suspicious, however, based on the server identifying the particular identity of the user device and recognizing that the user device includes a TEE with RoT functions. Based on the modification to the media file occurring at the identified and trusted user device having the TEE, the server can determine that the content of the media file has not been suspiciously modified and the server can, therefore, infer that the veracity of the content of the media file is generally intact, in some embodiments. Additionally, in some embodiments, the server can compare the at least one contemporaneous characteristic of the initial hash value to the server-side recorded characteristics, and can compare the at least one new contemporaneous characteristic to the server-side recorded characteristics. The contemporaneous characteristic comparisons can also be used to verify that the media file was modified at the known user device, and thus, was not suspiciously modified.

Once attested hash values are stored to the distributed electronic ledger, the hash values become immutable such that the initial hash value of the media file provides a digital provenance for the media file.

Regarding the embodiments discussed herein, because the public-key encrypted hash value that is immutably stored in the distributed electronic ledger includes one or more contemporaneous characteristics from the network and/or service provider level, the digital provenance for the initial instance of the media file can encode detailed information about the generation of the media file and/or the entry of the media file into the private network through an access point. Additionally, the digital provenance for the initial instance of the media file can encode detailed information about the user device, in some embodiments, as operating in the private network. For example, detailed information about the silicon chip used in the user device to generate the media file can be recorded (e.g., an environment operating sequence of the silicon chip at a specific date and time and temperature associated with the generation of the media file). Such information is unique to the operation of the user device, in the private network, at a specific date and time, and thus the information is generally unique such that exact replication or duplication thereof would be difficult if not impossible. Accordingly, in some embodiments, the digital provenance can include information that can indicate that a particular silicon chip within a particular user device generated the raw data of the media file at a specific date and time and at a specific GPS location, and further that the initial instance of the media file entered the private network using a particular access point at a specific date and time and at a specific GPS location of the access point.

Media Authenticity Determinations

After an initial hash value of an initial instance of a media file has been stored in the distributed electronic ledger, the server associated with the private network of the service provider can leverage the digital provenance of the media file to identify when suspicious modifications are subsequently made to the media file as the media file travels through the private network, in embodiments.

Figure 4:
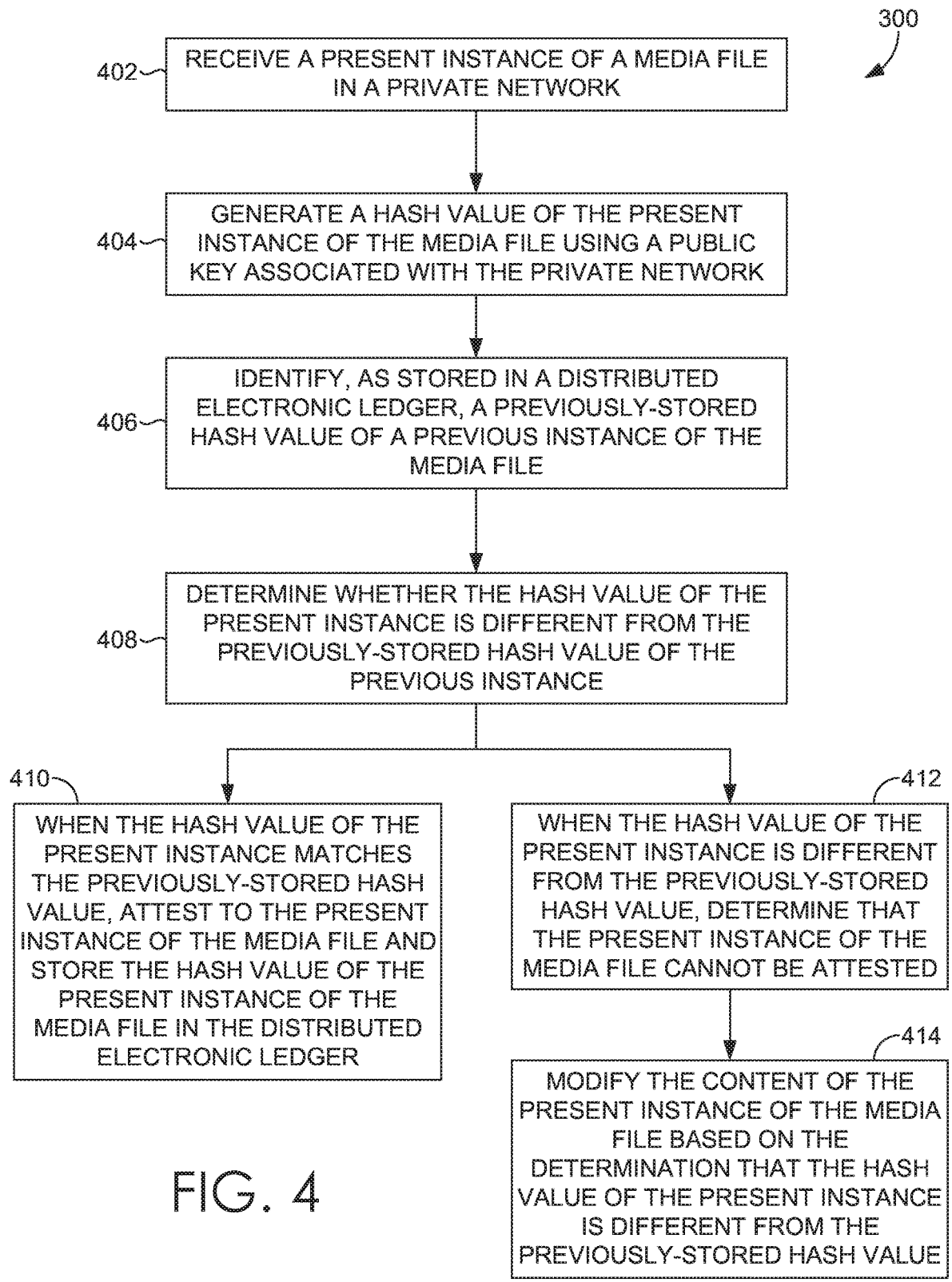
FIG. 4 illustrates another example method in accordance with an embodiment.
Figure 5:
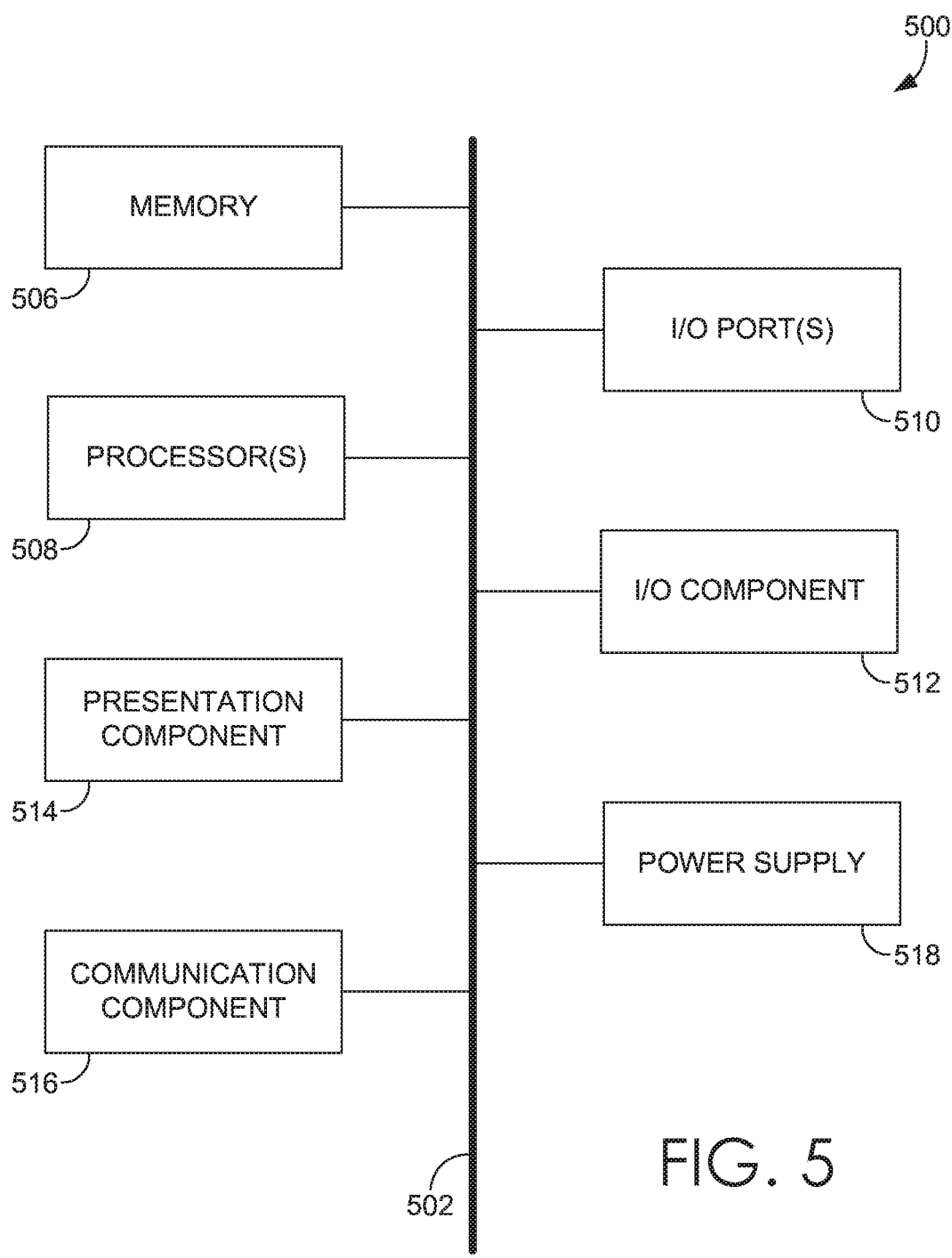
FIG. 5 depicts a block diagram of a computing device in accordance with an embodiment.

Turning to FIG. 4, a method 400 is provided for determining when a media file has been suspiciously modified. In some embodiments, the method 400 can be a computer-implemented method. In one embodiment, one or more non-transitory computer-readable storage media having computer-readable instructions or computer-readable program code portions embodied thereon, for execution via one or more processors, can be used to implement and/or perform the method 400. For example, computer-readable instructions or computer-readable program code portions can specify the performance of the method 400, can specify a sequence of steps of the method 400, and/or can identify particular component(s) of a software and/or hardware for performing one or more of the steps of the method 400, in embodiments. The computer-readable instructions or computer-readable program code portions can correspond to an application and/or an application programming interface (API), in some embodiments. In one embodiment, the application or API can implement and/or perform the method 400. As discussed below, the method 400 can be performed using software, hardware, component(s), and/or device(s) depicted in the example of FIGS. 1 and/or 2. For example, one or more steps of the method 400 can be performed at a server associated with a service provider, using one or more processors of the server.

At block 402, a present instance of a media file is received in the private network. In embodiments, the present instance of the media file can be received from a user device that is registered with the service provider of the private network or from a user device that is not registered with the service provider of the private network. Generally, the "present" instance of the media file that is discussed with regard to method 400 refers to an occurrence of the media file in the private network that is subsequent to the initial media file for which a digital provenance was established. As such, the term "present" is intended to distinguish the particular occurrence of the media file from any prior instances. The present instance of the media file can be uploaded, communicated, or otherwise sent over the private network by a user device, for example, when a user attempts to publish, post, share, text, email, or send the media file to another user of another user device. In some embodiments, a server on the private network detects that a media file is being communicated, receives the media file, and proceeds with the method 400 to determine whether the media file has been suspiciously modified.

At block 404, a hash value of the present instance of the media file is generated using a public key associated with the private network. For example, the server can use the present instance of the media file as the input to a cryptographic hash function that uses the public key in order to return a fixed-size string of bytes representing the media file, i.e., a hash value. This present hash value represents the present instance of the media file encountered by the server in the private network, for example.

At block 406, the method 400 comprises identifying, as stored in the distributed electronic ledger, a previously-stored hash value of a previous instance of the media file. In one embodiment, the previously-stored hash value that is identified corresponds to the initial hash value of the initial instance of the media file. In another embodiment, the previously-stored hash value that is identified corresponds to another hash value of a prior, but not initial, instance of the media file. In some embodiments, a plurality of previously-recorded hash values corresponding to a plurality of previous instances of the media file are identified, wherein each previously-stored hash value corresponds to a sequentially recorded hash value for a sequential instance of the media file within the private network.

The previously-stored hash value can comprise at least one contemporaneous characteristic. The contemporaneous characteristic corresponds to data that was captured contemporaneously with the generation of the hash value by an application on a user device, in some embodiments. The contemporaneous characteristic corresponds to data that was captured contemporaneously with an encryption of the previously-stored hash value by a user device, in some embodiments. For example, the contemporaneous characteristic can correspond to data that was captured contemporaneously with an encryption of the previously-stored hash value by a user device, using a public key, and/or using a private key. In another embodiment, the contemporaneous characteristic corresponds to data that was captured contemporaneously with the generation of the previously-stored hash value by an application operating on a user device. The contemporaneous characteristic can include, in an embodiment, one or more network parameters and/or subscriber parameters. The contemporaneous characteristic can be one or more of: an International Mobile Equipment Identity (IMNI), an International Mobile Subscriber Identity (IMSI), EC, a Global Positioning System (GPS) location, a base station identifier, an Internet Protocol (IP) address, an S1 interface protocol, or Inter-member Network data.

At block 408, it is determined whether the hash value of the present instance is different from the previously-stored hash value of the previous instance. As discussed above, a hash value of the initial instance of the media file was generated using the public key and was stored in the distributed electronic ledger to create a digital provenance for the particular media file. As such, the present hash value can be compared to the hash value of the initial instance of the media file, in embodiments. When the present instance of the media file has not been modified relative to the previous instance of the media file, then the present hash value generated from the present instance of the media file and the previously-stored hash value of the previous instance of the media file are the same (i.e., hash values are the same). When the present instance of the media file has been modified relative to the previous instance of the media file, the present hash value generated from the present instance of the media file is different from the previously-stored hash value of the previous instance of the media file (i.e., hash values are different). For example, when the present instance of the media file has been modified relative to the previous instance of the media file, the present instance that is encrypted using the public key produces a different hash because the data of the present media file instance is different than the data of the previous media file instance. Additionally, the server can determine whether a most-recent timestamp of the present instance of the media file matches a timestamp associated with an initial instance of the media file.

At block 410, when the hash value of the present instance matches the previously-stored hash value, the present instance of the media file is attested and the hash value of the present instance of the media file is stored in the distributed electronic ledger. In embodiments, the present instance of the media file is attested and the hash value of the present instance of the media file is stored in the distributed electronic ledger when the hash values match, independent of whether the user device that provided the present instance of the media file is known and/or trusted by the private network. In some embodiments, the previously-stored hash value comprises at least one contemporaneous characteristic that corresponds to data captured contemporaneously to a generation of the previously-stored hash value, as discussed above. In such an embodiment, when the hash value of the present instance matches the previously-stored hash value, the method 400 can further determine that the hash value of the present instance includes the at least one contemporaneous characteristic that corresponds to the data captured contemporaneously to the generation of the previously-stored hash value. In response, the method 400 can determine that content of the present instance of the media file has not been modified, in an embodiment. In some embodiments, the previously-stored hash value comprises at least one contemporaneous characteristic that corresponds to data captured contemporaneously to an encryption of the previously-stored hash value, such that the method 400 can determine that the hash value of the present instance includes the at least one contemporaneous characteristic that corresponds to the data captured contemporaneously to the encryption of the previously-stored hash value.

In embodiments, when the hash value of the present instance matches the previously-stored hash value, the present instance of the media file is attested and the hash value of the present instance of the media file is stored in the distributed electronic ledger. Though not shown in FIG. 3, in some further embodiments, the content of the present instance of the media file can be modified based on the determination that the hash value of the present instance matches the previously-stored hash value, i.e., that the veracity of the media file is inferred to be intact based on the matching of hash values. In this example, modifying the content of the present instance of the media file comprises certificate of authority adding content to the media file that verifies veracity of the media file. In another embodiment, the method 400 can determine that the media file is an image and add a visible watermark to the image of the media file, wherein the watermark indicates that veracity of the image of the present instance of the media file is verified. For example, a visible watermark of text stating "Verified," "Trusted Content," and "Original" can be added to the image content itself such that a user viewing the image can see the visible watermark. In yet another embodiment, the method 400 can determine that the media file is a video and can add, to the video, one or more of an audio, image, or additional video (i.e., a video "clip") that verifies the veracity of the video of the present instance of the media file. For example, a video clip with text stating that the content of the video has not been modified since entering the private network and is thought to be factually accurate (e.g., content is trusted by the private network) can be prepended to the video such that the video clip is played back prior to the presentation of the remaining video of the media file.

Alternatively, at block 312, when the hash value of the present instance is different from the previously-stored hash value, the method 400 can determine that the present instance of the media file cannot be attested. In some embodiments, the server, for example, can determine that the present instance of the media file cannot be attested based on determining that the hash value of the present instance is different from the previously-stored hash value. In some embodiments, the present instance of the media file is not attested to and is not stored in the distributed electronic ledger when the hash values do not match, independent of whether the user device that provided the present instance of the media file is known and/or trusted by the private network.

In embodiments, when the hash value of the present instance is different than the previously-stored hash value, the server can determine that the hash value of the present instance does not include the at least one contemporaneous characteristic that corresponds to the data captured contemporaneously to the generation of the previously-stored hash value and/or the encryption of the previously-stored hash value. Based on the determination, the server can further determine that content of the present instance of the media file has been modified, in embodiments. In further embodiments of the method 400, the server, for example, can determine that the present instance of the media file cannot be attested based on the determination that the hash value of the present instance does not include the at least one contemporaneous characteristic that corresponds to the data captured contemporaneously to the generation of the previously-stored hash value.

At block 314, the content of the present instance of the media file can be modified based on the determination that the hash value of the present instance is different from the previously-stored hash value. In one embodiment, modifying the content of the present instance of the media file comprises adding content to the media file that disclaims veracity of the media file. In another embodiment, the method 400 can determine that the media file is an image and add a visible watermark to the image of the media file, wherein the watermark indicates that veracity of the image of the present instance of the media file is disclaimed. For example, a visible watermark of text stating "Caution," "Suspicious Content," "Modifications Detected," "Content Edited," "Unverified," "Deep Fake," or "Suspicious Source" can be added to the image content itself such that a user viewing the image can see the visible watermark. In yet another embodiment, the method 400 can determine that the media file is a video and can add, to the video, one or more of an audio, image, or additional video (i.e., a video "clip") that disclaims veracity of the video of the present instance of the media file. For example, a video clip with text stating that the content of the video has been modified and could be factually inaccurate (e.g., content could be fake) can be prepended to the video such that the video clip is played back prior to the presentation of the remaining video of the media file.

Additionally of alternatively, a server in the private network can prevent the present instance of the media file from being communicated through the private network based on the determination that the hash value of the present instance is different from one or more of previously-stored hash values. In this way, the suspiciously modified instance of the media file is prevented from being promulgated throughout the private network, and/or the spread of the suspiciously modified instance of the media file to other entities is reduced or slowed. In some embodiments, a server in the private network can send a notification to one or more entities, user devices (i.e., users of the user devices), other servers, or social media platform(s) that the present instance of the media file has been suspiciously modified.

In addition to the embodiment discussed above, when a server determines that an instance of a media file has not been modified and thus, that the content of the media file has not been suspiciously modified, the server can utilize machine learning and/or artificial intelligence to identify objects in the content of the media file. In further embodiments, the objects identified in a plurality of media files can be indexed to form an authenticated content store of media files. Other entities such as websites and social media platforms, for example, can communicate with the server(s) in the private network through an API. The other entities can provide media files to the server(s) wherein the server(s) perform the method(s) previously described in order to identify media files that are modified and can contain fake content. Additionally or alternatively, the other entities can perform a query, or a reverse query, of the authenticated content store of media files (i.e., media files that are determined not to be modified), using media files present in the networks, websites, or platforms corresponding to the other entities. In this manner, entities external to the private network can, through an API and/or a media file search engine (e.g., image search), use the authenticated content store of media files to determine whether an instance of a media file may have been suspiciously modified, in various embodiments.

Additionally, in various embodiments, each instance of a media file that appears within the private network has been evaluated for veracity based on modifications, as discussed above, such that the method is repeatable, periodically, continuously, or in response to the location of a new or additional instance of a media file on the private network. Further, a record can be generated and added to a media-file-specific blockchain to individually document each distinct appearance of the new or additional instance of a media file on the private network, and further, to document each modification for the new or additional instance of a media file on the private network.

Turning to FIG. 4, it depicts a block diagram of a computing device 500 suitable to implement embodiments of the present invention. It will be understood by those of ordinary skill in the art that the computing device 500 is just one non-limiting example of a suitable computing device and is not intended to limit the scope of use or functionality of the present invention. Similarly, the computing device 500 should not be interpreted as imputing any dependency and/or any requirements with regard to each component and combination(s) of components illustrated in FIG. 4. It will be appreciated by those having ordinary skill in the art that the connections illustrated in FIG. 4 can comprise other methods, hardware, software, and/or devices for establishing a communications link between the components, devices, systems, and entities. Although the connections are depicted using one or more solid lines, it will be understood by those having ordinary skill in the art that the connections of FIG. 4 can be hardwired or wireless, and can use intermediary components that have been omitted or not included in FIG. 4 for simplicity's sake. As such, the absence of components from FIG. 4 should be not be interpreted as limiting the present invention to exclude additional components and combination(s) of components. Moreover, though devices and components are represented in FIG. 4 as singular devices and components, it will be appreciated that some embodiments can include a plurality of the devices and components such that FIG. 4 should not be considered as limiting the number of a devices or components.

Continuing, the computing device 500 can be in the form of a server, in some embodiments. Although illustrated as one component in FIG. 4, the present invention can utilize a plurality of local servers and/or remote servers in the computing device 500. The computing device 500 can include components such as a processing unit, internal system memory, and a suitable system bus for coupling to various components, including a database or database cluster. The system bus can be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

The computing device 500 can include or can have access to computer-readable media. Computer-readable media can be any available media that can be accessed by server. Computer-readable media can include one or more of volatile media, nonvolatile media, removable media, or non-removable media. By way of a non-limiting example, computer-readable media can include computer storage media and/or communication media. Non-limiting examples of computer storage media can include one or more of volatile media, nonvolatile media, removable media, or non-removable media, can be implemented in any method and/or any technology for storage of information, such as computer-readable instructions, data structures, program modules, or other data. In this regard, non-limiting examples of computer storage media can include Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage device, or any other medium which can be used to store information and which can be accessed by the server. Generally, computer storage media is non-transitory such that it does not comprise a signal per se.

Communication media can embody computer-readable instructions, data structures, program modules, and/or other data in a modulated data signal, such as a carrier wave or other transport mechanism. Communication media can include any information delivery media. As used herein, the term "modulated data signal" refers to a signal that has one or more of its attributes set or changed in such a manner as to encode information in the signal. Non-limiting examples of communication media can include wired media, such as a wired network connection, a direct-wired connection, and/or a wireless media, such as acoustic, radio frequency (RF), infrared, and other wireless media. Combinations of any of the above also can be included within the scope of computer-readable media.

Continuing with FIG. 4, the a block diagram of a computing device 500 suitable for providing packing instructions is provided, in accordance with an embodiment of the technology. It should be noted that although some components depicted in FIG. 4 are shown in the singular, they can be plural, and the components can be connected in a different, including distributed, configuration. For example, computing device 500 can include multiple processors and/or multiple radios. As shown in FIG. 4, computing device 500 includes a bus 502 that can directly or indirectly connect different components together, including memory 506 and a processor 508. In further embodiments, the computing device 500 can include one or more of an input/output (I/O) port 510, I/O component 512, presentation component 514, or communication component 516, such as a radio transceiver. The computing device 500 can be coupled to a power supply 518, in some embodiments.

Memory 506 can take the form of the memory components described herein. Thus, further elaboration will not be provided here, but it should be noted that memory 506 can include any type of tangible medium that is capable of storing information, such as a database. A database can include any collection of records, data, and/or other information. In one embodiment, memory 506 can include a set of computer-executable instructions that, when executed, facilitate various functions or steps disclosed herein. These instructions will variously be referred to as "instructions" or an "application" for short. Processor 508 can actually be multiple processors that can receive instructions and process them accordingly. Presentation component 514 can include a display, a speaker, a screen, a portable digital device, and/or other components that can present information through visual (e.g., a display, a screen, a lamp, a light-emitting diode (LED), a graphical user interface (GUI), and/or even a lighted keyboard), auditory (e.g., a speaker), haptic feedback, and/or other tactile cues. The communication component 616 can facilitate communication with the private network, for example, and one or more user devices that are associated with subscribers of a service provider. Additionally or alternatively, the communication component 516 can facilitate wired and wireless communications over the private network, or other network(s). Examples of wireless communications can include Wi-Fi, WiMAX, LTE, Bluetooth, and/or VoIP communications. In various embodiments, the communication component 516 can be configured to concurrently support multiple technologies.

I/O port 510 can take a variety of forms. Exemplary I/O ports can include a USB jack, a stereo jack, an infrared port, a firewire port, and/or other proprietary communications ports. 110 component 512 can comprise one or more keyboards, microphones, speakers, touchscreens, and/or any other item useable to directly or indirectly input data into the computing device 500. Power supply 518 can include batteries, fuel cells, and/or any other component that can act as a power source to supply power to computing device 500 or to other components.

Although internal components of the computing device 500 are not illustrated for simplicity, those of ordinary skill in the art will appreciate that internal components and their interconnection are present in the computing device 500 of FIG. 4. Accordingly, additional details concerning the internal construction of the computing device 500 are not further disclosed herein.

Regarding FIGS. 1 through 4, it will be understood by those of ordinary skill in the art that the environment(s), system(s), and/or methods(s) depicted are not intended to limit the scope of use or functionality of the present embodiments. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated in the figures are contemplated to potentially include methods, hardware, software, and/or other devices for establishing a communications link between the components, devices, systems, and/or entities, as can be utilized in implementation of the present embodiments. As such, the absence of component(s) and/or steps(s) from the figures should not be interpreted as limiting the present embodiments to exclude additional component(s) and/or combination(s) of components. Moreover, though devices and components in the figures can be represented as singular devices and/or components, it will be appreciated that some embodiments can include a plurality of devices and/or components such that the figures should not be considered as limiting the number of devices and/or components.

It is noted that embodiments of the present invention are described herein with reference to block diagrams and flowchart illustrations. However, it should be understood that each block of the block diagrams and/or flowchart illustrations can be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code can be performed sequentially such that one instruction is retrieved, loaded, and executed at a time. In some embodiments, retrieval, loading, and/or execution can be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Additionally, as should be appreciated, various embodiments of the present disclosure described herein can also be implemented as methods, apparatus, systems, computing devices/entities, computing entities, and/or the like. As such, embodiments of the present disclosure can take the form of an apparatus, system, computing device, computing entity, and/or the like executing instructions stored on a computer-readable storage medium to perform certain steps or operations. However, embodiments of the present disclosure can also take the form of an entirely hardware embodiment performing certain steps or operations.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and can be employed without reference to other features and subcombinations and are contemplated within the scope of the claims.

What is claimed is:

1. A method comprising:
   receiving an indication that a media file is generated;
   generating an initial hash value of an initial instance of the media file;
   encrypting the initial hash value utilizing a private key that is associated with a user device in a trusted execution environment operating thereon;
   encrypting at least one contemporaneous characteristic into the initial hash value utilizing a public key associated with a private network;
   communicating the initial instance of the media file and the encrypted initial hash value to a server on the private network for storage in a distributed electronic ledger;
   receiving another instance of the media file in the private network;

generating a hash value of the other instance of the media file using the public key associated with the private network;

identifying, as stored in the distributed electronic ledger, the initial hash value of the initial instance of the media file;

determining whether the hash value of the other instance is different from the initial hash value of the initial instance; and when the hash value of the other instance matches the initial hash value of the initial instance, attesting to the other instance of the media file and storing the hash value of the other instance of the media file in the distributed electronic ledger.

2. The method of claim 1, wherein the computer-readable instructions further comprise:

determining, when the hash value of the other instance is different from the initial hash value, that the other instance of the media file cannot be attested; and modifying content of the other instance of the media file.

3. The method of claim 2, wherein modifying the content of the other instance of the media file comprises:

determining that the media file is an image; and adding a visible watermark to the image of the media file, wherein the visible watermark indicates that veracity of the image of the other instance of the media file is disclaimed.

4. The method of claim 2, wherein modifying the content of the other instance of the media file comprises:

determining that the media file is a video; and adding, to the video, one or more of an image, audio, or additional video that disclaims veracity of the video of the other instance of the media file.

5. The method of claim 2, wherein modifying the content of the other instance of the media file comprises adding additional content to the media file that disclaims veracity of the media file.

6. The method of claim 1, wherein the at least one contemporaneous characteristic corresponds to data captured contemporaneously to generating the initial hash value.

7. The method of claim 6, wherein the computer-readable instructions further comprise:

when the hash value of the other instance matches the initial hash value, determining that the hash value of the other instance includes the at least one contemporaneous characteristic that corresponds to the data captured contemporaneously to the generation of the initial hash value; and determining that content of the other instance of the media file has not been modified.

8. One or more computer-readable storage media having computer-readable instructions embodied therein for execution by one or more processors, the computer-readable instructions comprising:

receiving an indication that a media file is generated;

generating an initial hash value of an initial instance of the media file;

encrypting the initial hash value utilizing a private key that is associated with a user device in a trusted execution environment operating thereon;

encrypting at least one contemporaneous characteristic with the initial hash value utilizing a public key associated with a private network;

communicating the initial instance of the media file and the encrypted initial hash value with the encrypted at least one contemporaneous characteristic to a server on the private network for storage in a distributed electronic ledger;

receiving another instance of the media file in the private network;

generating a hash value of the other instance of the media file using the public key associated with the private network;

identifying, as stored in the distributed electronic ledger, the initial hash value of the initial instance of the media file;

determining that the hash value of the other instance is different from the initial hash value of the initial instance;

determining the other instance of the media file cannot be attested based on determining that the hash value of the other instance is different from the initial hash value; and modifying content of the other instance of the media file.

9. The computer-readable storage media of claim 8, wherein the computer-readable instructions further comprise determining that the media file is an image, and wherein modifying the content of the other instance of the media file comprises adding a visible watermark to the image, wherein the visible watermark indicates that veracity of the image of the other instance of the media file is disclaimed.

10. The computer-readable storage media of claim 8, wherein the computer-readable instructions further comprise determining that the media file is a video, and wherein modifying the content of the other instance of the media file comprises adding, to the video, one or more of an image, audio, or additional video that disclaims veracity of the video of the other instance of the media file.

11. The computer-readable storage media of claim 8, wherein modifying the content of the other instance of the media file comprises adding content to the media file that disclaims veracity of the media file.

12. The computer-readable storage media of claim 9, wherein the at least one contemporaneous characteristic comprises one or more of: an International Mobile Equipment Identity (IMNI), an International Mobile Subscriber Identity (IMSI), EC, a Global Positioning System (GPS) location, a base station identifier, an Internet Protocol (IP) address, an S1 interface protocol, or Inter-member Network data.

13. The computer-readable storage media of claim 12, wherein the computer-readable instructions further comprise:

when the hash value of the other instance is different than the initial hash value, determining that the hash value of the other instance does not include the at least one contemporaneous characteristic that corresponds to the data captured contemporaneously to the encryption of the initial hash value; and determining that content of the other instance of the media file has been modified.

14. The computer-readable storage media of claim 13, wherein determining that the other instance of the media file cannot be attested is based on determining that the hash value of the other instance does not include the at least one contemporaneous characteristic that corresponds to the data captured contemporaneously to the encryption of the initial hash value.

15. The computer-readable storage media of claim 8, wherein the computer-readable instructions further comprise:

receiving the initial instance of the media file and the initial hash value of the initial instance of the media file from the user device that is registered with the private network;

decrypting the initial hash value using the private key associated with the user device;

determining that the at least one contemporaneous characteristic in the initial hash value corresponds to private network data, wherein the private network data comprises one or more of network parameters or subscriber parameters;

generating a second hash value by encrypting the initial instance of the media file using the public key associated with the private network based on determining that the at least one contemporaneous characteristic in the initial hash value corresponds to the private network data; and storing the second hash value in the distributed electronic ledger.

16. The computer-readable storage media of claim 8, wherein the computer-readable instructions further comprise:

generating a certificate of authority that is associated with the private network; and communicating the certificate of authority to the user device over the private network.

17. The computer-readable storage media of claim 16, wherein the computer-readable instructions further comprise:

when the initial instance of the media file and the initial hash value are received from the user device, referencing the certificate of authority of the user device; and attesting that the user device includes the trusted execution environment operating as a root of trust based on the certificate of authority.

* * * * *